(12) United States Patent
Agarwal et al.

(10) Patent No.: US 12,464,195 B2
(45) Date of Patent: Nov. 4, 2025

(54) SEARCH SYSTEMS BASED ON USER RELEVANCE AND REVENUE GENERATION

(71) Applicant: Roku, Inc., San Jose, CA (US)

(72) Inventors: Rahul Agarwal, London (GB); Abhishek Majumdar, Santa Clara, CA (US); Yu Zhou, Sunnyvale, CA (US); Ratul Ray, Santa Clara, CA (US); Yuzhong Li, Taylor, TX (US); Nitish Aggarwal, Sunnyvale, CA (US); Srimaruti Manoj Nimmagadda, Saratoga, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 18/744,191

(22) Filed: Jun. 14, 2024

(65) Prior Publication Data

US 2024/0430538 A1    Dec. 26, 2024

Related U.S. Application Data

(60) Provisional application No. 63/523,288, filed on Jun. 26, 2023.

(51) Int. Cl.
*H04N 21/482* (2011.01)
*H04N 21/466* (2011.01)
*H04N 21/472* (2011.01)

(52) U.S. Cl.
CPC ..... *H04N 21/4826* (2013.01); *H04N 21/4663* (2013.01); *H04N 21/47202* (2013.01)

(58) Field of Classification Search
CPC ............ H04N 21/812; H04N 21/4532; H04N 21/4784; H04N 21/4826; H04N 21/4668; H04N 21/4825
See application file for complete search history.

(56) References Cited

U.S. PATENT DOCUMENTS

| | | | | |
|---|---|---|---|---|
| 10,515,116 | B2 * | 12/2019 | Zheng | G06F 16/7867 |
| 2011/0243529 | A1 * | 10/2011 | Oryoji | G06F 16/7847 |
| | | | | 386/248 |
| 2013/0268973 | A1 * | 10/2013 | Archibong | G06Q 50/01 |
| | | | | 709/204 |
| 2016/0345044 | A1 * | 11/2016 | Klappert | H04N 21/458 |

(Continued)

*Primary Examiner* — Jason Salce
(74) *Attorney, Agent, or Firm* — STERNE, KESSLER, GOLDSTEIN & FOX P.L.L.C.

(57) ABSTRACT

Disclosed herein are system, apparatus, article of manufacture, method and/or computer program product embodiments, and/or combinations and sub-combinations thereof, for determining a list of recommended items in response to a user query. An embodiment can generate an ordered relevance list of items, and determine an initial reward value based on an array of relevance scores and an array of revenue values corresponding to the ordered relevance list of items, a parameter alpha assigned to the array of relevance scores, and a parameter beta assigned to the array of revenue values. The embodiment can generate a next list of recommended items from an initial list of recommended items, and further calculate a next reward value associated with the next list of recommended items, and determine a list of recommended items in response to the query based on a comparison of the initial reward value and the next reward value.

20 Claims, 5 Drawing Sheets

(56) References Cited

U.S. PATENT DOCUMENTS

2021/0204023 A1\* 7/2021 Knox ............... H04N 21/42201
2021/0250651 A1\* 8/2021 Kim ................... H04N 21/4532
2022/0191453 A1\* 6/2022 Wang ............. H04N 21/234327
2024/0104305 A1\* 3/2024 Glesinger ............ G06V 10/421

\* cited by examiner

SEARCH SYSTEMS BASED ON USER RELEVANCE AND REVENUE GENERATION

RELATED APPLICATIONS

This application claims benefit of U.S. Provisional Patent Application No. 63/523,288 filed Jun. 26, 2023, the content of which is herein incorporated by references in its entirety.

FIELD

This disclosure is generally directed to a search system that can provide recommendations considering both user relevance and revenue generation to provide multimedia content to viewers or users.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
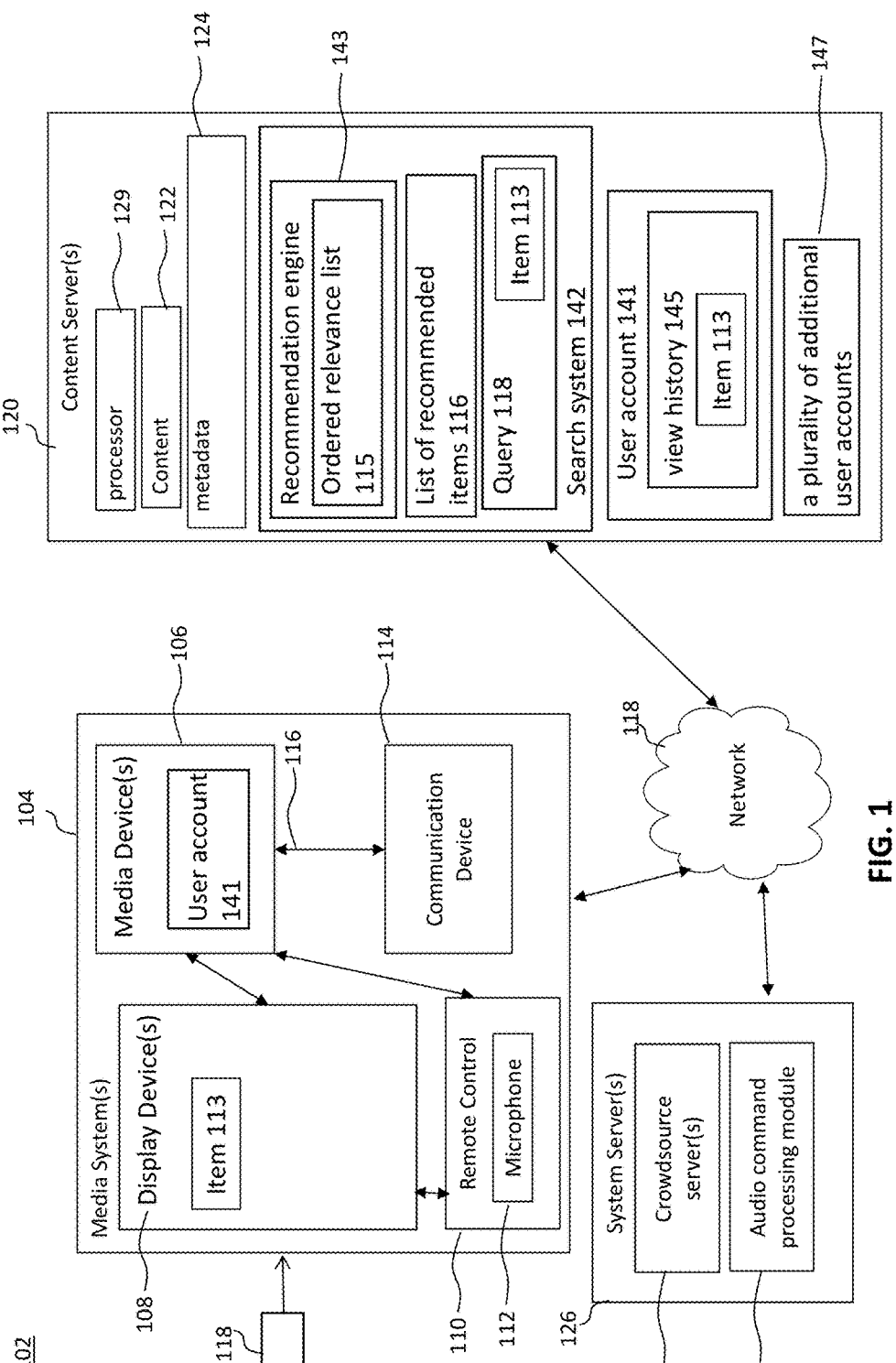
FIG. 1 illustrates a block diagram of a multimedia environment including a search system to generate a list of recommended items in response to a user query, according to some embodiments.

Consumption of media content is a part of daily life in the society. Media content can be created by various content creators, provided to a platform by content providers, and further delivered to the viewers or users through the platform. For example, a video can be created by a movie studio, and placed into an online provider platform, while the user can select the video to watch on a computing device using the online provider platform. Given the large amount of media content available in a platform, it often becomes difficult for a user to select a video or content item. A search or recommendation system can be used to help the user to select a content item to watch or consume. A search system, such as a content-based search system, can recommend content items to a user by various criteria based on the descriptions or features of content items. However, search systems still have many problems that need improved solutions.

Provided herein are system, apparatus, article of manufacture, method and/or computer program product embodiments, and/or combinations and sub-combinations thereof, for a content-based search system to generate a recommendation including a list of recommended content items for a user based on a user query or a content item description. A content-based search system may simply be referred to as a search system. A content item, or simply an item, can be a media item including a movie, a media clip, an advertisement segment, a photo, a music file, an audio book, a game, or any other media format. An item can be delivered to a user device by a platform for a user to consume, e.g., watching a video, listening to a music or audio content, playing a game, or other forms of consuming the item. In the description below, examples of a user watching a video may be used as illustrations of a user consuming any content item. Techniques described herein can be applicable to other types of content item, such as audio books or games.

When a user consumes an item on a computing device or a media device, the platform may charge a fee from the user, similar to a user buying a video to watch from an online vendor. Hence, an item consumed by a user can generate an amount of revenue for the company owning or operating the platform delivering the items to the user's computing device. In some aspects, the revenue may be generated for other companies associated with the platform. The revenue may include income generated by charging the user for the item being watched, or income generated through advertisements or partner signups between the platform and other content providers or creators. In some aspects, an item may be classified into different types, such as an advertising-based video on demand (AVOD) type, a subscription video on demand (SVOD) type, or some other types. A revenue amount may be generated by an item based on the item type. In some aspects, a revenue amount may be generated by an item individually, where items of the same type can generate different amount of revenue.

After a user finishes watching a video, the search system of the platform can generate a list of recommended items for a user to watch next. In addition, a user may provide a query to the search system to select items of interest to the user, and the search system can generate a list of recommended items for the user based on the query. In some aspects, a description of an item currently or previously watched can be viewed as a special or an implicit user query.

In some aspects, as an initial list of recommended items, the search system may generate an ordered relevance list of items based on the relevance of the items to the user and the user query. The ordered relevance list of items is an ordered list, where items in the ordered list are ranked based on relevance scores of the items with respect to the user and the user query. The ordered relevance list of items used as a list of recommended items can enhance user engagement and retention. However, the ordered relevance list of items may fail to consider the revenue generation.

In some aspects, a search system may generate a list of recommended items by a heuristic approach to prioritize and promote high-revenue generation items. A first item generating a higher revenue may have a higher rank, which can be lower relevance, in the list of recommended items than a second item generating a lower revenue. However, such a list of recommended items based only on the revenue generation may ignore the user interests and relevance to the user and user query. Accordingly, such a list of recommended items can risk eroding user trust in the platform and ultimately leading to customer frustration.

In some aspects, a search system can generate a list of recommended items for a user by considering both the relevance of an item to a user and a user query, and the amount of revenue generated by the item. Accordingly, aspects herein can address the dual objectives of maximizing revenue while minimizing the risk of losing users' trust in the platform. The amount of revenue can be assigned individually to the item, or assigned to all items of the same type. The search system can generate a list of recommended items that increases revenue generation while reducing the likelihood of user churn.

In some aspects, the search system may generate the list of recommended items in two steps. At a first step, an ordered relevance list of items based on the relevance of the items to the user and the user query can be generated as an initial list of recommended items. Accordingly, a list of relevance scores corresponding to the ordered relevance list of items can be generated, and a list of revenue values corresponding to the ordered relevance list of items can also be generated. Afterwards, a reward value associated with the ordered relevance list of items can be calculated based on the list of relevance scores and the list of revenue values corresponding to the ordered relevance list of items. The reward value can be determined based on a parameter alpha assigned to the list of relevance scores to represent the weight or importance of the item relevance in the reward value calculation. In addition, the reward value can be determined based on a parameter beta assigned to the list of revenue values to represent the weight or importance of the revenue values in the reward value calculation. The use of parameter alpha and parameter beta can provide the flexibility to adjust the importance of relevance versus revenue generation using different parameters according to the business needs and goals. In addition, the reward value can be determined based on a parameter array gamma_relevance representing the influence of the ranking position in the relevance, and a parameter array gamma_revenue representing the influence of the ranking position in the revenue values.

In some aspects, at a second step, the search system can search in iteration for an optimized list of recommended items as the list of recommended items to optimize a reward value assigned to the optimized list of recommended items. The initial list of recommended items can be the starting point of the iteration. For a current list of recommended items during the iteration, a reward value of the current list, reward(currentList), can be calculated similarly as the reward value associated with the ordered relevance list of items. Two or more items of the current list of recommended items can be selected to be switched to derive a next list of recommended items. The search system can further calculate a reward value for the next list of recommended items, reward(nextList). By comparing the reward(currentList) with reward(nextList), the search system can determine an action to take in the iteration to derive the optimized list of recommended items.

In some aspects, the selection of two or more items of the current list of recommended items to be switched can be based on any applicable optimization method. In some aspects, Markov Chain Monte Carlo (MCMC) method can be used to select two items of the current list of recommended items to be switched to generate the next list of recommended items. If the reward(nextList) is greater than or equal to the reward(currentList), the search system moves to a state to place the next list of recommended items as the new current list of recommended items, and further generates a new next list of recommended items. On the other hand, if the reward(nextList) is less than the reward(currentList), the search system moves to a state with a very small probability of exploring the space given by acceptance probability, which can be calculated by acceptance probability=min (1, exp (reward(nextList)−reward(currentList)).

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to multimedia environment 102, as will be appreciated by persons skilled in the relevant art(s) based on the teachings contained herein. An example of multimedia environment 102 shall now be described.

Multimedia Environment

FIG. 1 illustrates a block diagram of multimedia environment 102 including a search system to generate a list of recommended items in response to a user query, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. Media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play media content item, e.g., item 113, which can be a current item being viewed by a user account. Various users, such as one or more user 132 may operate with media system 104 to select and consume content such as item 113.

Each media system 104 may include one or more media devices 106 each coupled to one or more display devices 108. Media device 106 may be referred to as a computing device as well. It is noted that terms such as "coupled," "connected to," "attached," "linked," "combined" and similar terms may refer to physical, electrical, magnetic, logical, etc., connections, unless otherwise specified herein.

Media device 106 may be a streaming media device, a streaming set-top box (STB), cable and satellite STB, a DVD or BLU-RAY device, an audio/video playback device, ca able box, and/or a digital video recording device, to name just a few examples. Display device 108 may be a monitor, a television (TV), a computer, a computer monitor, a smart phone, a tablet, a wearable (such as a watch or glasses), an appliance, an internet of things (IoT) device, and/or a projector, to name just a few examples. In some embodiments, media device 106 can be a part of, integrated with, attached to, operatively coupled to, and/or connected to its respective display device 108. Media device 106 can provide media content, such as item 113, to display device 108.

Each media device 106 may be configured to communicate with network 118 via a communication device 114. Communication device 114 may include, for example, a cable modem or satellite TV transceiver. Media device 106 may communicate with communication device 114 over a link 116, where link 116 may include wireless (such as WiFi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106, display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106, or display device 108 using cellular, Bluetooth, infrared, etc., or any combination thereof.

Multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118. Content server 120, media device 106, display device 108, may be collectively referred to as a media system, which may be an extension of media system 104. In some embodiments, a media system may include system server 126 as well.

Each content server 120 may include a controller or one or more processor 129, and a memory or storage device to store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form. Content 122 may be the source for item 113 displayed on display device 108.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122, such as but not limited to a trick mode index.

In some embodiments, content server 120 may manage a plurality of media accounts or user accounts, e.g., user account 141 that is associated with media device 106, and a plurality of additional user accounts 147. A user account, such as user account 141, may be shared and accessible among multiple users, such as one or more members of a household. User account 141 may have a view history 145 of the user account 141, where view history 145 can include item 113 being presented on display device 108.

Figure 3:
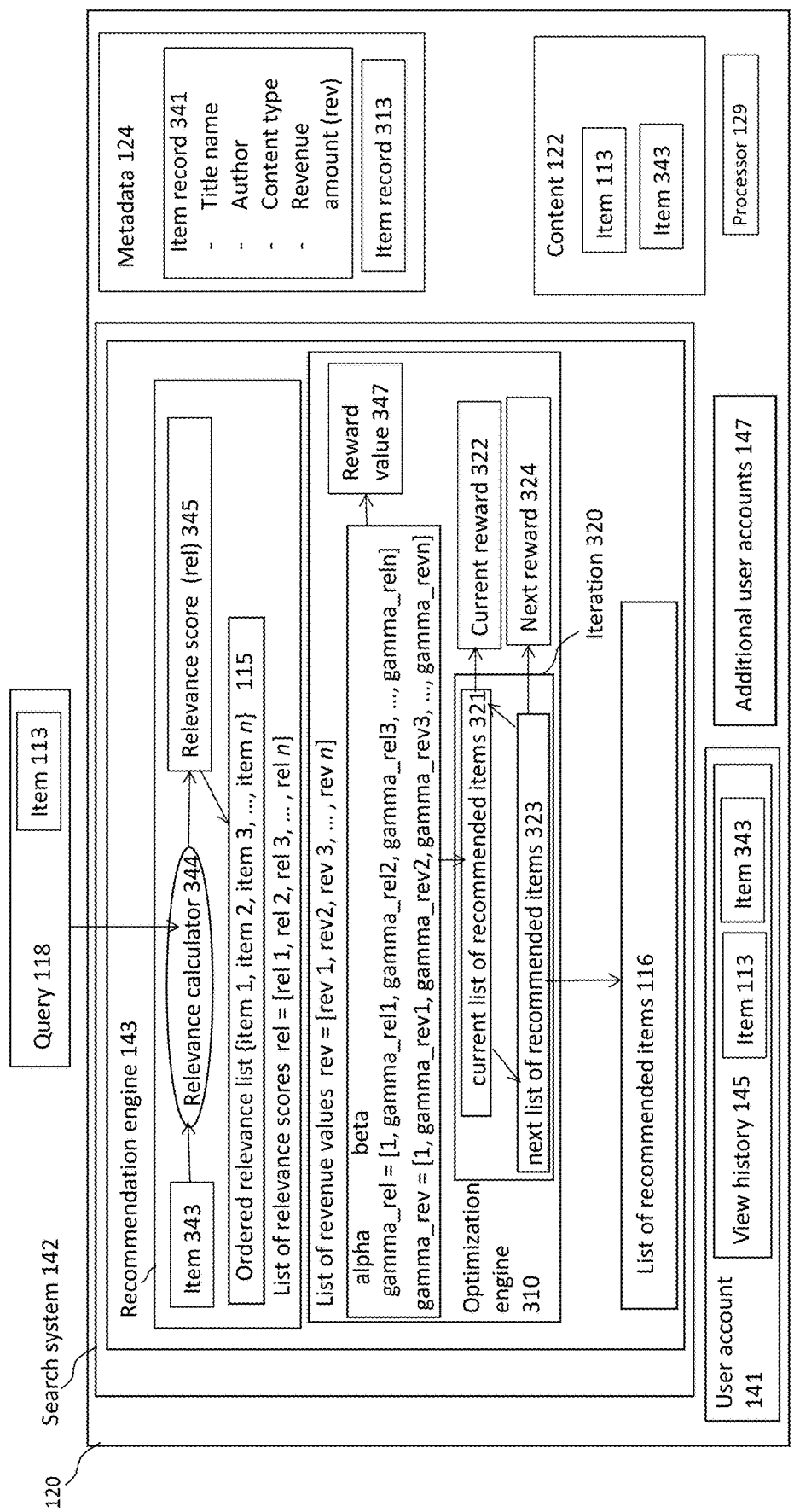
FIG. 3 illustrates an example content server including a search system to generate a list of recommended items in response to a user query, according to some embodiments.
Figure 4:
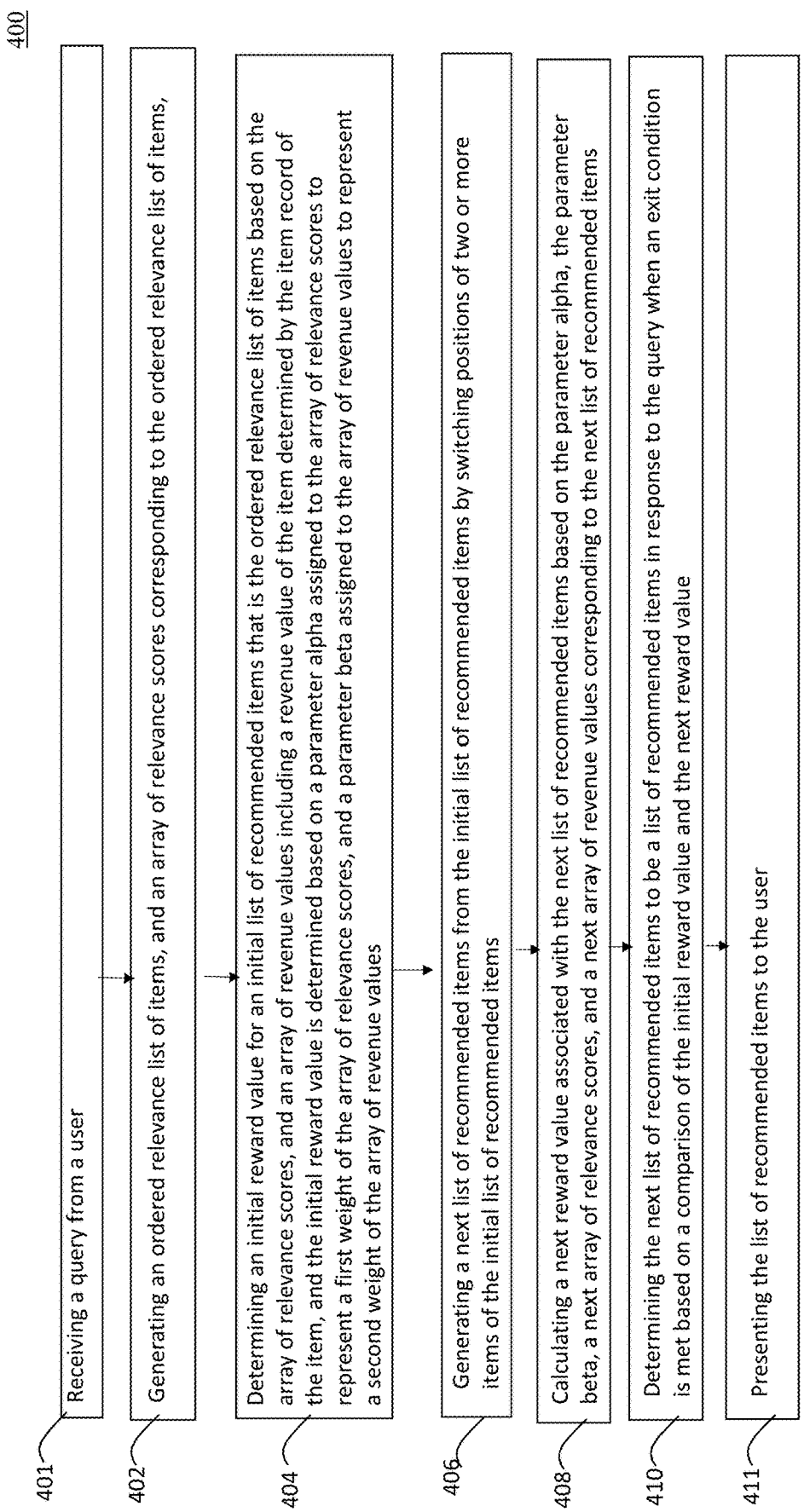
FIG. 4 illustrates an example process performed by a computing device to generate a list of recommended items in response to a user query, according to some embodiments.

In some embodiments, content server 120 may include a search system 142 that further include a recommendation engine 143. User 132 may provide a query 118, which can be received by media device 106 or display device 108, and further transmitted to search system 142. In some embodiments, descriptions of item 113 can be treated as a special query, such as an implicit query. Based on query 118, user account 141, recommendation engine 143 can generate an ordered relevance list of items 115. Each item of ordered relevance list of items 115 can have a corresponding relevance score calculated based on the description of the item, query 118, and information about user account 141. Ordered relevance list of items 115 can be deemed as an initial list of recommended items. In addition, search system 142 can search, in iteration, for an optimized list of recommended items to optimize a reward value assigned to the optimized list of recommended items. Search system 142 can produce a list of recommended items 116 at the end of the iteration as the response to user query 118. Details of operations of search system 142 are illustrated in FIGS. 3 and 4.

Multimedia environment 102 may include one or more system servers 126. System servers 126 may operate to support media device 106 from the cloud. It is noted that the structural and functional aspects of system servers 126 may wholly or partially exist in the same or different ones of system servers 126. System servers 126 and content server 120 together may be referred to as a media server system. An overall media system may include a media server system and media system 104. In some embodiments, a media system may refer to the overall media system including the media server system and media system 104.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users, watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streaming of the movie. In some embodiments, crowdsource server(s) 128 can be located at content server 120. In some embodiments, some part of content server 120 functions can be implemented by system server 126 as well.

System servers 126 may also include an audio command processing module 130. As noted above, remote control 110 may include a microphone 112. Microphone 112 may receive audio data from user 132 (as well as other sources, such as display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize a verbal command from user 132. Audio command processing module 130 may then forward the verbal command back to media device 106 for processing.

Figure 2:
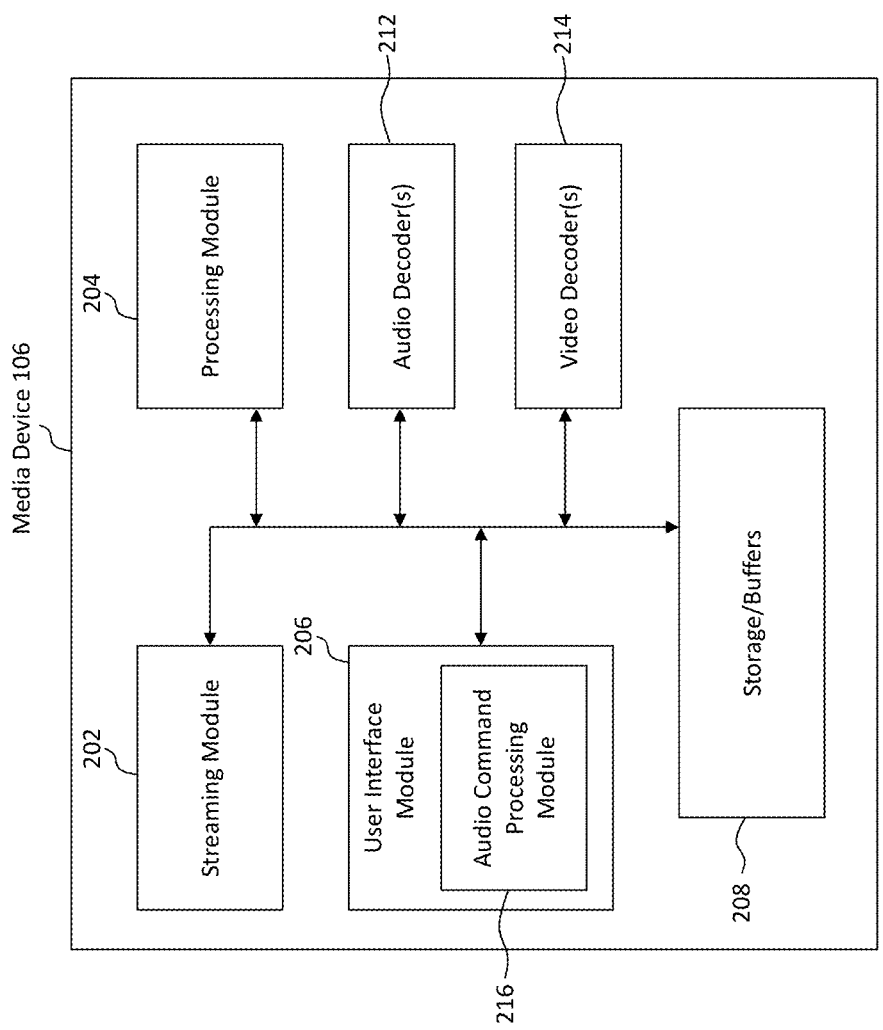
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

FIG. 2 illustrates a block diagram of an example media device 106, according to some embodiments. Media device 106 may include a streaming module 202, a processing module 204, a storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OPla, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 for playback to user 132.

In streaming embodiments, streaming module 202 may transmit the content to display device 108 in real time or near real time as it receives such content from content server(s) 120. In non-streaming embodiments, media device 106 may store the content received from content server(s) 120 in storage/buffers 208 for later playback on display device 108.

Recommendation Engine

FIG. 3 illustrates an example content server 120 including search system 142 to generate a list of recommended items 116 in response to a query 118, according to some embodiments. In some aspects, functions described herein can be implemented in an independent computing device instead of being implemented on server 120. Operations performed by search system 142 may be performed by one or more processor 129. Query 118 may be referred to as a user query, and can include a question, one or more key words, a title of a content item such as a title of item 113, or any format of query.

In some aspects, content server 120 can store content 122 and metadata 124. Content 122 may include item 113, item 343, and other items, which can be any combination of music, videos, movies, TV programs, multimedia, images, still pictures, text, graphics, gaming applications, advertisements, programming content, public service content, government content, local community content, software, and/or any other content or data objects in electronic form. Metadata 124 comprises data about content 122. For example, metadata 124 may include item record 341 associated with item 343. Item record 341 can include information about item 343 such as title name, author, a content type of item 343. Item record 341 can also include a revenue amount for item 343, which can be denoted as rev indicating an amount of money that can be generated when item 343 is consumed by a user. Item record 341 can also include ancillary information indicating or related to writer, director, producer, composer, artist, actor, summary, chapters, production, history, year, trailers, alternate versions, related content, applications, and/or any other information pertaining or relating to item 343. Item record 341 may also or alternatively include links to any such information pertaining or relating to content 122. Similarly, item record 313 can include metadata information associated with item 113.

In some aspects, content server 120 may manage a plurality of media accounts or user accounts, e.g., user account 141 that is associated with media device 106, and a plurality of additional user accounts 147. A user account, such as user account 141, may be shared and accessible among multiple users, such as one or more members of a household. User account 141 may have a view history 145 of the user account 141, where view history 145 can include item 113 and item 343 being presented on display device 108.

In some aspects, search system 142 can receive query 118 from a user, and generate list of recommended items 116 in two steps. At a first step, ordered relevance list of items 115 can be generated by recommendation engine 143 based on the relevance of the items to the user, user query 118, and information about user account 141. Recommendation engine 143 can include a relevance calculator 344 to calculate a relevance score 345, which can be denoted as "rel", for item 343. In some aspects, relevance score 345 can be a probability value between 0 and 1. In some other aspects, relevance score 345 can be a real number larger than 1. Relevance calculator 344 can calculate relevance score 345 based on machine learning techniques, natural language processing techniques, such as word embedding, any other techniques known to one having ordinary skills in the arts. In some aspects, recommendation engine 143 or relevance calculator 344 can determine relevance score 345 as a probability that item 343 is going to be watched by the user based on user query 118. In some aspects, relevance score 345 can be calculated using a tool related to a w2v model. The w2v model, which can be referred to as Word2Vec model, can be a combination of models used to represent distributed representations of words in a corpus. W2v model can include an algorithm that accepts text corpus as an input and outputs a vector representation for each word and its associated probabilities.

In some aspects, recommendation engine 143 can calculate the relevance scores for multiple items, such as relevance score 345 for item 343, and further generate ordered relevance list of items 115 based on the relevance scores. For example, recommendation engine 143 can generate ordered relevance list of items 115 to include items with the highest 100 relevance scores with respect to query 118, such as an ordered list {item 1, item 2, item 3, . . . , item n}, where n is a nature number representing the size of the ordered list. The items in the ordered list, such as "item 1", is a notation, such as a title, or an identifier of item 1, instead of the file containing the content of item 1. Accordingly, a list of relevance scores corresponding to the ordered relevance list of items 115 can be generated. In some aspects, the list of relevance scores can be represented as an array rel=[rel 1, rel 2, rel 3, . . . , rel n], where each element of array rel is a relevance score of an item with respect to query 118, user information such as information related to user account 141. Ordered relevance list of items 115 is ordered by the size of relevance scores so that array rel=[rel 1, rel 2, rel 3, . . . , rel n] is in decreasing order satisfying the equation that rel 1>=rel 2>=rel 3>=, . . . , >=rel n. Ordered relevance list of items 115 may be generated based on relevance scores for multiple items, and may not consider the revenue generation aspect of items. Ordered relevance list of items 115 can be considered as an initial list of recommended items.

In some aspects, an optimization engine 310 can receive ordered relevance list of items 115 and start an iteration to optimize the initial list of recommended items by considering the revenue generation aspect of items. Accordingly, a list of revenue values corresponding with ordered relevance list of items 115 can be generated, which can be represented as an array rev=[rev 1, rev 2, rev 3, . . . , rev n], where each element of array rev is an amount of revenue that can be generated by an item included in ordered relevance list of items 115.

In some aspects, optimization engine 310 can further generate a reward value 347 associated with ordered relevance list of items 115 based on the list of relevance scores represented as array rel=[rel 1, rel 2, rel 3, . . . , rel n], and the list of revenue values represented as array rev=[rev 1, rev 2, rev 3, . . . , rev n]. Reward value 347 can be determined based on a parameter alpha assigned to array rel=[rel 1, rel 2, rel 3, . . . , rel n] to represent the weight or importance of the item relevance in the reward value calculation. In addition, reward value 347 can be determined based on a parameter beta assigned to array rev=[rev 1, rev 2, rev 3, . . . , rev n] to represent the weight or importance of the revenue values in the reward value calculation. The use of parameter alpha and parameter beta can provide the flexibility to adjust the importance of relevance versus revenue generation using different parameters according to the business needs and goals. In addition, reward value 347 can be determined based on a parameter array gamma_rel= [1, gamma_rel1, gamma_rel2, gamma_rel3, . . . , gamma_reln] representing the influence of the ranking position in the relevance, and a parameter array gamma_rev=[1, gamma_rev1, gamma_rev2, gamma_rev3, . . . , gamma_revn] representing the influence of the ranking position in the revenue values. In some aspects, array gamma_rel can be determined based on formulas: gamma_rel2=(gamma_rel1)$^2$, . . . , gamma_reln=(gamma_rel1)$^n$, where 0<gamma_rel1<1. Similarly, array gamma_rev can be determined based on formulas: gamma_rev2=(gamma_rev1)$^2$, . . . , gamma_revn=(gamma_rev1)$^n$, where 0<gamma_rev1<1. In detail, reward value 347 for ordered relevance list of items 115 can be computed by formula: reward value=alpha*dotprod (gamma_rel, rel)+beta*dotprod (gamma_rev, rev), where dotprod represents the dot product or component wise product of two arrays, array rel=[rel 1, rel 2, rel 3, . . . , rel n] and array gamma_rel=[1, gamma_rel1, gamma_rel2, gamma_rel3, . . . , gamma_reln], or array rev=[rev 1, rev 2, rev 3, . . . , rev n] and array gamma_rev= [1, gamma_rev1, gamma_rev2, gamma_rev3, . . . , gamma_revn]. For example, dotprod (gamma_rel, rel)=1*(rel 1)+gamma_rel1*(rel 2)+ . . . +gamma_reln*(rel n).

In some aspects, at a second step, search system 142 or optimization engine 310 can search in iteration 320 for an optimized list of recommended items as list of recommended items 116 to optimize a reward value assigned to the optimized list of recommended items. The initial list or first list of recommended items, which is the ordered relevance list of items 115, can be the starting point of the iteration, and the iteration can move from a current list of recommended items to a next list of recommended items. For a current list of recommended items 321 during the iteration, current list of recommended items 321 can have a relevance array, current rel=[current rel 1, current rel 2, current rel 3, . . . , current rel n], and a revenue array, current rev=[current rev 1, current rev 2, current rev 3, . . . , current rev n], a reward value of the current list, reward(currentList), which may be referred to as a current reward 322, can be calculated similarly as the reward value associated with the ordered relevance list of items 115 as shown above. Two or more items of current list of recommended items 321 can be selected to be switched to derive a next list of recommended items 323. The next list of recommended items 323 can have a relevance array, next rel=[next rel 1, next rel 2, next rel 3, . . . , next rel n], and a revenue array, next rev=[next rev 1, next rev 2, next rev 3, . . . , next rev n]. Optimization engine 310 can further calculate a reward value for the next list of recommended items, reward(nextList), which may be referred to as a next reward 324. By comparing the reward (currentList) with reward(nextList), optimization engine 310 can determine an action to take in the iteration to derive the optimized list of recommended items. In some aspects, the reward of a list of recommended items can be calculated in a different way, such as computing the differences between reward(nextList)−reward(currentList), which can be computed by a formula: reward value=alpha*dotprod (gamma_rel, (next rel−current rel))+beta*dotprod (gamma_rev, (next rev−current rev)).

In some aspects, the selection of two or more items of current list of recommended items 321 to be switched can be based on any applicable optimization method. In some aspects, Markov Chain Monte Carlo (MCMC) method can be used to select two items of current list of recommended items 321 to be switched to generate next list of recommended items 323. If the reward(nextList) is greater than or equal to the reward(currentList), optimization engine 310 can move to the state to place next list of recommended items 323 as a new current list of recommended items, and further generate a new next list of recommended items. On the other hand, if the reward(nextList) is less than the reward(currentList), optimization engine 310 can move to the state with a very small probability of exploring the space given by acceptance probability, which can be calculated by acceptance probability=min (1, exp (reward(nextList)−reward(currentList)).

In some aspects, optimization engine 310 may end iteration 320 in finding next list of recommended items 323 when an exit condition is met. For example, when a difference between reward(nextList) and reward(currentList) is smaller than a first predetermined threshold value, or the total reward reward(nextList) is bigger than a second predetermined threshold value, optimization engine 310 can stop the iteration and produce the next list of recommended items 323 as list of recommended items 116 in response to query 118.

FIG. 4 illustrates an example process 400 performed by a computing device to generate a list of recommended items in response to a user query, according to some embodiments. Processes 400 can be performed by processing logic that can comprise hardware (e.g., circuitry, dedicated logic, programmable logic, microcode, etc.), software (e.g., instructions executing on a processing device, such as by one or more processor 129), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

At 401, search system 142 can receive query 118 from a user.

At 402, search system 142 can generate ordered relevance list of items 115, and an array of relevance scores corresponding to ordered relevance list of items 115. The array of relevance scores includes a relevance score of an item determined based on an item record of the item, a query from a user, and information about a user account of the user;

At 404, search system 142 can determine an initial reward value 347 for an initial list of recommended items that is ordered relevance list of items 115 based on the array of relevance scores, and an array of revenue values including a revenue value of the item determined by the item record of the item. The initial reward value 347 can be determined based on a parameter alpha assigned to the array of relevance scores to represent a first weight of the array of relevance scores, and a parameter beta assigned to the array of revenue values to represent a second weight of the array of revenue values.

In some aspects, the initial reward value can be determined based on the parameter alpha, the parameter beta, a first gamma array associated with the array of relevance scores of the initial list, and a second gamma array associated with the array of revenue values of the initial list. For example, the initial reward value can be determined based on a formula: the initial reward value=alpha*dotprod (the first gamma array, the array of relevance scores of the initial list)+beta*dotprod (the second gamma array, the array of revenue values of the initial list), wherein dotprod represents a dot product operation of two arrays.

At 406, search system 142 can generate next list of recommended items 323 from the initial list of recommended items, which can be a current list of recommended items 321, by switching positions of two or more items of the initial list of recommended items.

At 408, search system 142 can calculate next reward value 324 associated with next list of recommended items 323 based on the parameter alpha, the parameter beta, a next array of relevance scores, and a next array of revenue values corresponding to the next list of recommended items.

At 410, search system 142 can determine the next list of recommended items 323 to be list of recommended items 116 in response to query 118 when an exit condition is met based on a comparison of the initial reward value and the next reward value.

At 411, search system 142 can present the list of recommended items 116 to the user.

Example Computer System

Figure 5:
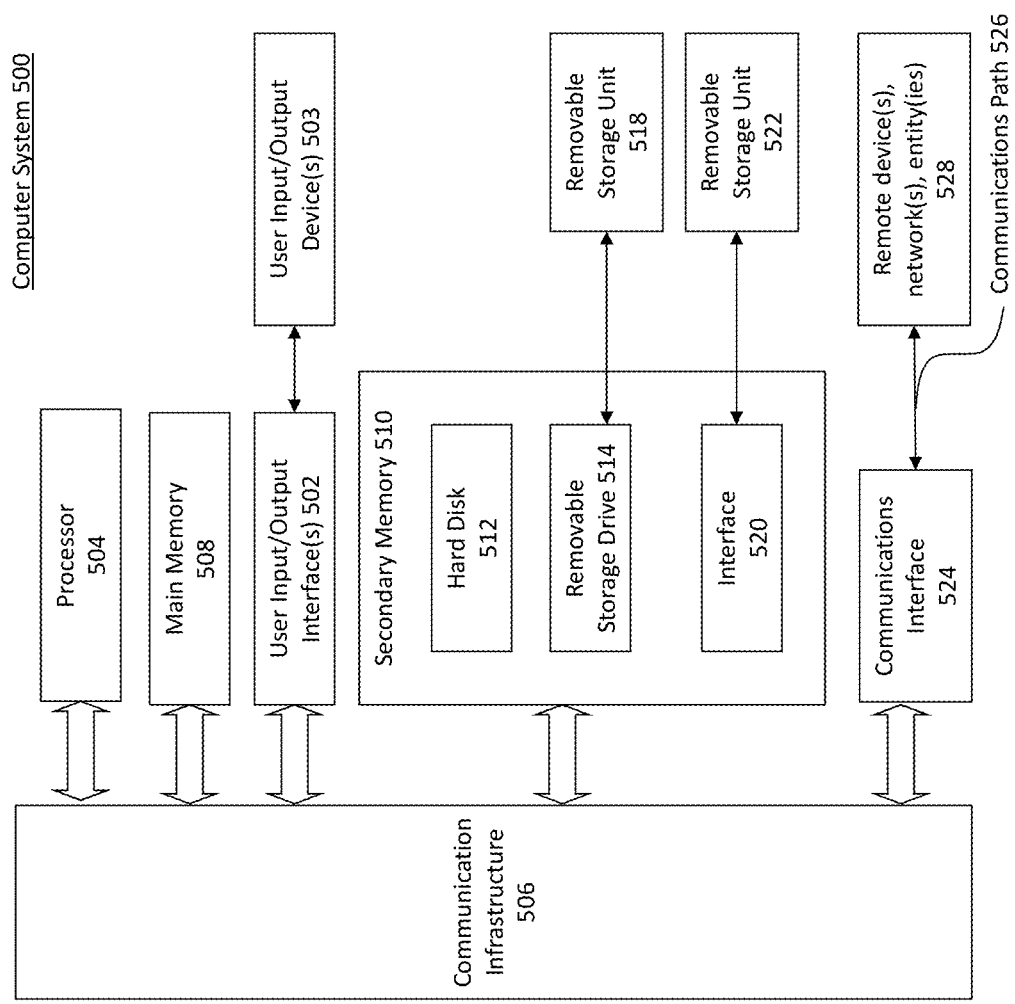
FIG. 5 illustrates an example computer system useful for implementing various embodiments.

Various embodiments may be implemented, for example, using one or more well-known computer systems, such as computer system 500 shown in FIG. 5. For example, media device 106, display device 108, content server 120, system server 126, may be implemented using combinations or sub-combinations of computer system 500 to perform various functions described herein, e.g., by process 400. Also or alternatively, one or more computer systems 500 may be used, for example, to implement any of the embodiments discussed herein, such as server 120 and operations performed by server 120 as described in FIGS. 3 and 4, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:
1. A computer-implemented method, comprising:
receiving a query from a user;
generating, by at least one computer processor, an ordered relevance list of items, and an array of relevance scores corresponding to the ordered relevance list of items, wherein the array of relevance scores includes a relevance score of an item determined based on an item record of the item, the query from the user, and information about a user account of the user;
determining an initial reward value for an initial list of recommended items that is the ordered relevance list of items based on the array of relevance scores, and an array of revenue values including a revenue value of the item determined by the item record of the item, and the initial reward value is determined based on a parameter alpha assigned to the array of relevance scores to represent a first weight of the array of relevance scores, and a parameter beta assigned to the array of revenue values to represent a second weight of the array of revenue values;
generating a next list of recommended items from the initial list of recommended items by switching positions of two or more items of the initial list of recommended items;
calculating a next reward value associated with the next list of recommended items based on the parameter alpha, the parameter beta, a next array of relevance scores, and a next array of revenue values corresponding to the next list of recommended items;

determining the next list of recommended items to be a list of recommended items in response to the query when an exit condition is met based on a comparison of the initial reward value and the next reward value; and presenting the list of recommended items to the user.

2. The computer-implemented method of claim 1, wherein the initial reward value is determined based on the parameter alpha, the parameter beta, a first gamma array associated with the array of relevance scores of the initial list, and a second gamma array associated with the array of revenue values of the initial list.

3. The computer-implemented method of claim 2, wherein the initial reward value is determined based on a formula: the initial reward value=alpha*dotprod (the first gamma array, the array of relevance scores of the initial list)+beta*dotprod (the second gamma array, the array of revenue values of the initial list), wherein dotprod represents a dot product operation of two arrays.

4. The computer-implemented method of claim 2, wherein the first gamma array includes gamma_rel=[1, gamma_rel1, gamma_rel2, gamma_rel3, ... gamma_reln] representing an influence of a ranking position in the array of relevance scores, where gamma_rel2=(gamma_rel1)$^2$, ..., gamma_reln=(gamma_rel1)$^n$, and 0<gamma_rel1<1.

5. The computer-implemented method of claim 2, wherein the second gamma array includes gamma_rev=[1, gamma_rev1, gamma_rev2, gamma_rev3, ... gamma_revn] representing an influence of a ranking position in the array of revenue values, where gamma_rev2=(gamma_rev1)$^2$, ..., gamma_revn=(gamma_rev1)$^n$, and 0<gamma_rev1<1.

6. The computer-implemented method of claim 1, wherein the relevance score of the item represents a probability that item is going to be watched by the user based on the query.

7. The computer-implemented method of claim 1, wherein the two or more items of the initial list of recommended items being switched are selected based on a Markov Chain Monte Carlo (MCMC) method.

8. The computer-implemented method of claim 1, wherein the exit condition is met when a difference between the initial reward value and the next reward value is smaller than a first predetermined threshold value, or the next reward value of the next list of recommended items is bigger than a second predetermined threshold value.

9. The computer-implemented method of claim 1, wherein the relevance score of the item is determined by applying natural language processing techniques including word embedding based on the item record of the item, the query from the user, and information about the user account of the user.

10. The computer-implemented method of claim 1, wherein the next list of recommended items is a first next list of recommended items, the next reward value associated with the first next list of recommended items is a first next reward value, and the computer-implemented method further comprises:

assigning the first next list of recommended items to be a current list of recommended items when the exit condition is not met based on the comparison of the initial reward value and the next reward value;

generating a second next list of recommended items from the first next list of recommended items by switching positions of two or more items of the first next list of recommended items;

calculating a second next reward value associated with the second next list of recommended items based on the parameter alpha, the parameter beta, a second next array of relevance scores, and a second next array of revenue values corresponding to the second next list of recommended items; and determining the second next list of recommended items to be the list of recommended items in response to the query when the exit condition is met based on a comparison of the first next reward value and the second next reward value.

11. A system, comprising:

one or more memories configured to store a query from a user, information about a user account of the user, and an item record of the item for a list of items, a parameter alpha, and a parameter beta; and at least one processor each coupled to at least one of the one or more memories and configured to perform operations comprising:

generating an ordered relevance list of items, and an array of relevance scores corresponding to the ordered relevance list of items, wherein the array of relevance scores includes a relevance score of the item determined based on the item record of the item, the query from the user, and the information about the user account of the user;

determining an initial reward value for an initial list of recommended items that is the ordered relevance list of items based on the array of relevance scores, and an array of revenue values including a revenue value of the item determined by the item record of the item, and the initial reward value is determined based on the parameter alpha assigned to the array of relevance scores to represent a first weight of the array of relevance scores, and the parameter beta assigned to the array of revenue values to represent a second weight of the array of revenue values;

generating a next list of recommended items from the initial list of recommended items by switching positions of two or more items of the initial list of recommended items;

calculating a next reward value associated with the next list of recommended items based on the parameter alpha, the parameter beta, a next array of relevance scores, and a next array of revenue values corresponding to the next list of recommended items;

determining the next list of recommended items to be a list of recommended items in response to the query when an exit condition is met based on a comparison of the initial reward value and the next reward value; and presenting the list of recommended items to the user.

12. The system of claim 11, wherein the initial reward value is determined based on the parameter alpha, the parameter beta, a first gamma array associated with the array of relevance scores of the initial list, and a second gamma array associated with the array of revenue values of the initial list.

13. The system of claim 12, wherein the initial reward value is determined based on a formula: the initial reward value=alpha*dotprod (the first gamma array, the array of relevance scores of the initial list)+beta*dotprod (the second gamma array, the array of revenue values of the initial list), wherein dotprod represents a dot product operation of two arrays.

14. The system of claim 12, wherein the first gamma array includes gamma_rel=[1, gamma_rel1, gamma_rel2, gamma_rel3, . . . gamma_reln] representing an influence of a ranking position in the array of relevance scores, where gamma_rel2=(gamma_rel1)$^2$, . . . , gamma_reln=(gamma_rel1)$^n$, and 0<gamma_rel1<1.

15. The system of claim 12, wherein the second gamma array includes gamma_rev=[1, gamma_rev1, gamma_rev2, gamma_rev3, . . . gamma_revn] representing an influence of a ranking position in the array of revenue values, where gamma_rev2=(gamma_rev1)$^2$, . . . , gamma_revn=(gamma_rev1)$^n$, and 0<gamma_rev1<1.

16. The system of claim 11, wherein the relevance score of the item is determined by applying natural language processing techniques including word embedding based on the item record of the item, the query from the user, and information about the user account of the user.

17. The system of claim 11, wherein the next list of recommended items is a first next list of recommended items, the next reward value associated with the first next list of recommended items is a first next reward value, and the operations further comprise:
  assigning the first next list of recommended items to be a current list of recommended items when the exit condition is not met based on the comparison of the initial reward value and the next reward value;
  generating a second next list of recommended items from the first next list of recommended items by switching positions of two or more items of the first next list of recommended items;
  calculating a second next reward value associated with the second next list of recommended items based on the parameter alpha, the parameter beta, a second next array of relevance scores, and a second next array of revenue values corresponding to the second next list of recommended items; and
  determining the second next list of recommended items to be the list of recommended items in response to the query when the exit condition is met based on a comparison of the first next reward value and the second next reward value.

18. A non-transitory computer-readable medium having instructions stored thereon that, when executed by at least a computing device, cause the computing device to perform operations comprising:
  receiving a query from a user;
  generating, by at least one computer processor, an ordered relevance list of items, and an array of relevance scores corresponding to the ordered relevance list of items, wherein the array of relevance scores includes a relevance score of an item determined based on an item record of the item, the query from the user, and information about a user account of the user;
  determining an initial reward value for an initial list of recommended items that is the ordered relevance list of items based on the array of relevance scores, and an array of revenue values including a revenue value of the item determined by the item record of the item, and the initial reward value is determined based on a parameter alpha assigned to the array of relevance scores to represent a first weight of the array of relevance scores, and a parameter beta assigned to the array of revenue values to represent a second weight of the array of revenue values;
  generating a next list of recommended items from the initial list of recommended items by switching positions of two or more items of the initial list of recommended items;
  calculating a next reward value associated with the next list of recommended items based on the parameter alpha, the parameter beta, a next array of relevance scores, and a next array of revenue values corresponding to the next list of recommended items;
  determining the next list of recommended items to be a list of recommended items in response to the query when an exit condition is met based on a comparison of the initial reward value and the next reward value; and
  presenting the list of recommended items to the user.

19. The non-transitory computer-readable medium of claim 18, wherein the initial reward value is determined based on the parameter alpha, the parameter beta, a first gamma array associated with the array of relevance scores of the initial list, and a second gamma array associated with the array of revenue values of the initial list.

20. The non-transitory computer-readable medium of claim 19, wherein the initial reward value is determined based on a formula: the initial reward value=alpha*dotprod (the first gamma array, the array of relevance scores of the initial list)+beta*dotprod (the second gamma array, the array of revenue values of the initial list), wherein dotprod represents a dot product operation of two arrays;
  the first gamma array includes gamma_rel=[1, gamma_rel1, gamma_rel2, gamma_rel3, . . . gamma_reln] representing an influence of a ranking position in the array of relevance scores, where gamma_rel2=(gamma_rel1)$^2$, . . . , gamma_reln=(gamma_rel1)$^n$, and 0<gamma_rel1<1; and
  the second gamma array includes gamma_rev=[1, gamma_rev1, gamma_rev2, gamma_rev3, . . . gamma_revn] representing an influence of a ranking position in the array of revenue values, where gamma_rev2=(gamma_rev1)$^2$, . . . , gamma_revn=(gamma_rev1)$^n$, and 0<gamma_rev1<1.

* * * * *